United States Patent [19]

Leiser et al.

[11] Patent Number: 5,618,766
[45] Date of Patent: Apr. 8, 1997

[54] LIGHTWEIGHT CERAMIC COMPOSITION OF CARBON SILICON OXYGEN AND BORON

[75] Inventors: Daniel B. Leiser; Ming-Ta Hsu; Timothy S. Chen, all of San Jose, Calif.

[73] Assignee: The United States of America as represented by the Administrator of the National Aeronautics and Space Administration, Washington, D.C.

[21] Appl. No.: 681,146

[22] Filed: Jul. 22, 1996

[51] Int. Cl.$^6$ .......................... C04B 35/571; C04B 35/58
[52] U.S. Cl. ............................. 501/87; 501/12; 501/55; 501/96; 423/277; 423/325
[58] Field of Search .................................. 501/12, 55, 65, 501/87, 96; 423/277, 325, 415.1

[56] References Cited

U.S. PATENT DOCUMENTS

| Re. 32,107 | 4/1986 | January | 501/12 |
|---|---|---|---|
| 4,430,257 | 2/1984 | Pope et al. | 252/629 |
| 4,686,195 | 8/1987 | Yamane | 501/12 |
| 4,797,376 | 1/1989 | Caldwell et al. | 501/12 |
| 4,828,774 | 5/1989 | Andersson et al. | 264/60 |
| 4,851,150 | 7/1989 | Hench et al. | 264/42 |
| 4,902,650 | 2/1990 | Caldwell et al. | 501/12 |
| 5,015,605 | 5/1991 | Frey et al. | 501/12 |
| 5,021,369 | 6/1991 | Ackerman et al. | 501/95 |
| 5,128,286 | 7/1992 | Funayama et al. | 501/97 |
| 5,292,830 | 3/1994 | Funayama et al. | 423/277 |
| 5,340,777 | 8/1994 | Leung et al. | 501/55 |
| 5,543,485 | 8/1996 | Baldus | 501/97 |

OTHER PUBLICATIONS

Dotts, et. al., "The Toughest Tile Job Ever", pp. 616–626, Chemtech, Oct. 1984.

*Primary Examiner*—Karl Group
*Attorney, Agent, or Firm*—Kenneth L. Warsh; Harry Lupeloff; John G. Mannix

[57] ABSTRACT

Lightweight, monolithic ceramics resistant to oxidation in air at high temperatures are made by impregnating a porous carbon preform with a sol which contains a mixture of tetraethoxysilane, dimethyldiethoxysilane and trimethyl borate. The sol is gelled and dried on the carbon preform to form a ceramic precursor. The precursor is pyrolyzed in an inert atmosphere to form the ceramic which is made of carbon, silicon, oxygen and boron. The carbon of the preform reacts with the dried gel during the pyrolysis to form a component of the resulting ceramic. The ceramic is of the same size, shape and form as the carbon precursor. Thus, using a porous, fibrous carbon precursor, such as a carbon felt, results in a porous, fibrous ceramic. Ceramics of the invention are useful as lightweight tiles for a reentry spacecraft.

5 Claims, 1 Drawing Sheet

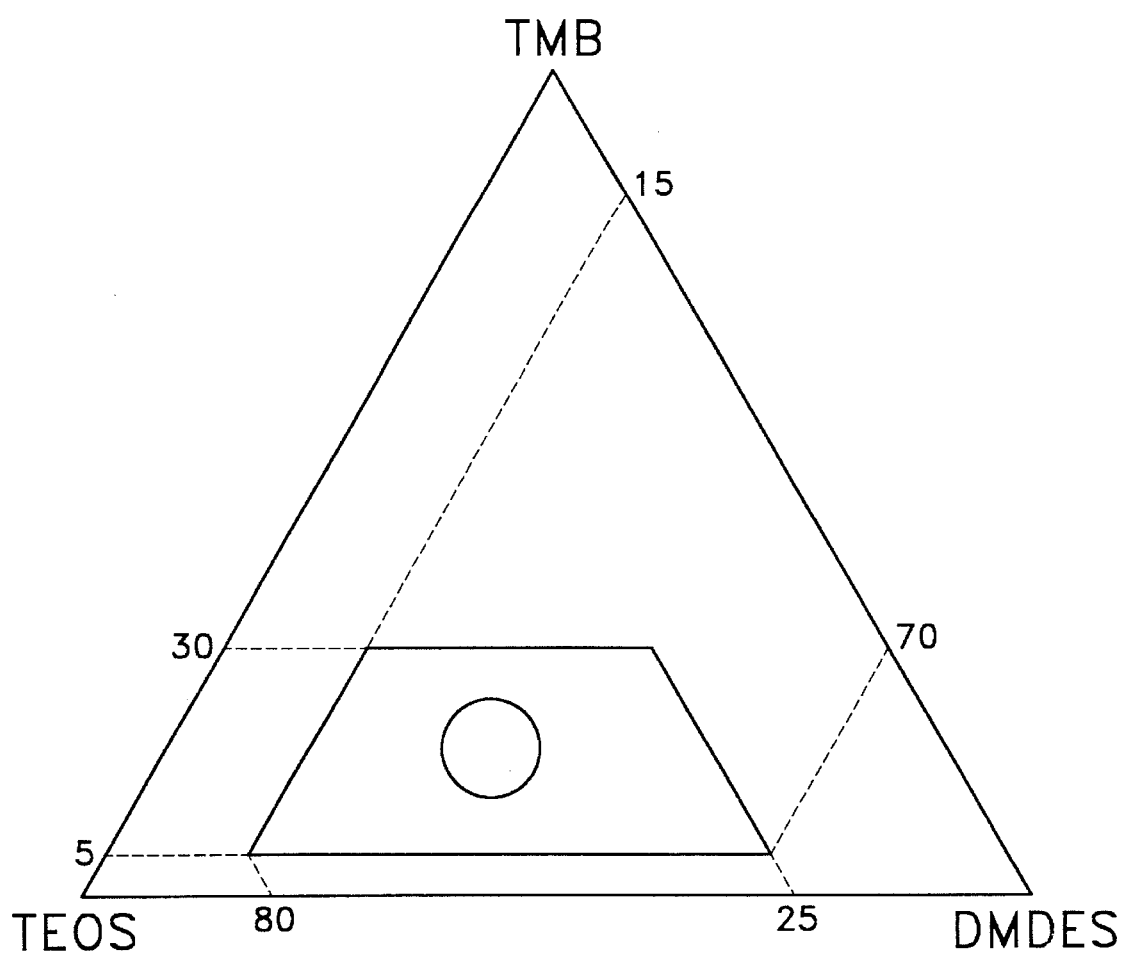

LIGHTWEIGHT CERAMIC COMPOSITION OF CARBON SILICON OXYGEN AND BORON

ORIGIN OF THE INVENTION

The invention described herein was made in the performance of work under a NASA contract and is subject to Public Law 96-517 (35 U.S.C. 200 et seq.). The contractor has not elected to retain title to the invention.

BACKGROUND OF THE INVENTION

1. Field of the Invention

The invention relates to an oxidation resistant ceramic comprising carbon, silicon, oxygen and boron. More particularly, the invention relates to a lightweight, monolithic ceramic composition of carbon, silicon, oxygen and boron which is able to retain its shape and strength when exposed to an oxidizing environment at 1200° C. and to a sol-gel method for its preparation comprising coating a carbon substrate with a sol comprising a mixture of di- and tetrafunctional siloxanes and a boron alkoxide, gelling the sol and heating the coated carbon substrate in an inert atmosphere to form the ceramic.

2. Background of the Disclosure

Reusable space vehicles, such as the space shuttle which must leave and reenter the earth's atmosphere, require exterior thermal insulation protection. The successful operation of the space shuttle required the development of light weight and very thermally efficient exterior insulation which had to withstand a wide variety of environments. During reentry back into earth's atmosphere, the insulation must maintain the vehicle's exterior structure below 175° C. while experiencing substantial aeroconvective thermal environments which can heat the surface of the insulation to temperatures in excess of 1,000° C. In space the thermal protection must insulate the vehicle from the deep and constant cold (e.g., −70° C.) experienced while in orbit. In addition to thermal and aeroconvective environments, the insulation must also be able to withstand the mechanical stress associated with launch vibrations, acoustics, structural movement of the surface of the vehicle and of the ceramic insulation, and the landing impact.

Both rigid and flexible ceramic compositions have been used as thermal insulation for protecting space vehicles has included both rigid and flexible ceramic compositions, with a rigid carbon/carbon composite tile used on the leading edges of the vehicle. Most of the ceramic composites are very porous in order to keep the weight down to a reasonable level and some have a void volume of over 90%. More advanced ceramic insulation has been and continues to be developed for space shuttles and other reentry space vehicles in which either all or a substantial portion of the insulation comprises one or more refractory metal oxides, carbides, borides, silicides, borosilicates and nitrides. Ceramic materials currently in use or in development include high purity silicon dioxide, aluminum oxide, silicon carbide, aluminosilicate, aluminoborosilicate and zirconium diboride as illustrative, but nonlimiting examples.

However, a reinforced, rigid carbon-carbon ceramic composite continues to be used on the leading edges of space vehicles as disclosed, for example, in an article by Dotts, et. al. "The Toughest Job Ever", p.616–626 in Chemtech, October, 1984. The reinforced carbon-carbon (RCC) structure disclosed in this article begins with a rayon cloth which is graphitized, impregnated with a phenolic resin and pyrolyzed, then impregnated with furfural alcohol and pyrolyzed again, with this process repeated until a density of 90 to 100 lb/ft$^3$ is achieved. The RCC is protected from oxidation by converting the outer surface to silicon carbide in a diffusion coating process. Additional oxidation resistance is provided by impregnation with tetraethylorthosilicate cured to form a silica residue to further reduce the area of exposed carbon, followed by sealing with a sodium silicate-SiC mixture to fill any remaining surface voids or cracks. This process is time consuming, costly, results in a composite which is much too heavy for today's more advanced payload and distance requirements and still results in a RCC material which is susceptible to oxidation where the carbon substrate is exposed. Hence, it would be an improvement to the art if a lightweight, oxidation resistant material could be made which possesses the light weight and high temperature thermal stability and insulating advantages of RCC, without its disadvantages.

SUMMARY OF THE INVENTION

The invention relates to a ceramic comprising carbon, silicon, oxygen and boron. More particularly, the invention relates to an oxidation resistant, amorphous ceramic composition of carbon, silicon, oxygen and boron and to a sol-gel method for its preparation. The ceramic of the invention is able to retain its shape and strength when exposed to an oxidizing environment at temperatures of 1200° C. and higher. The sol-gel method comprises coating a carbon substrate with a sol comprising a mixture of silicon alkoxides and a borate ester, such as di- and tetrafunctional siloxanes and boron alkoxide, gelling the sol and heating the coated carbon substrate in an inert atmosphere to form the ceramic. By di- and tetrafunctional alkoxides is meant silicon alkoxides having di- and tetraoxygen functionality in which the silicon alkoxide has two and four Si—O bonds, respectively. Siloxanes are useful in the practice of the invention and include a mixture of siloxanes with di- and tetraoxygen functionality of the general formula $(RO)_4Si$ and $(R'O)_2Si(R")_2$ wherein R and R' are the same or different and represent a hydrocarbyl group and wherein R" represents the same or different hydrocarbyl group as R and R'. By "hydrocarbyl" is meant a group containing carbon and hydrogen which may be straight or branched chain, saturated or unsaturated as will be explained in greater detail below. In general the number of carbon atoms in the hydrocarbyl group will broadly range from 1–8 and more typically from 1–6. The boron alkoxide is also multifunctional with respect to oxygen functionality, with at least a portion of the alkoxide being trifunctional with respect to B—O bonds. Borate esters useful in the practice of the invention include boron alkoxides of the formula $(RO)_3B$, wherein R comprises the same or different hydrocarbyl groups, with each hydrocarbyl group containing at least one carbon atom. The number of carbon atoms in the hydrocarbyl group will broadly range from 1–8, more typically from 1–6, and preferably from 1–4. Gelation of the sol is catalyzed by the addition of acid or base, such as nitric acid or ammonium hydroxide. The gel is dried prior to pyrolysis or high temperature heating in an inert atmosphere to form the ceramic. The ceramic is formed by heating the coated substrate in an inert atmosphere at a temperature in the range of from about 700°–1500° C. and preferably 900°–1200° C. The so-formed ceramic is amorphous, which means that it is monolithic or unitary in nature.

The molar or atomic ratio of the silicon, oxygen and boron in the sol used to form the gel is important for producing a ceramic composition of the invention and is determined by the molar ratio of the alkoxide reactants. It is believed that the carbon content of the ceramic is determined primarily by the carbon of the carbon substrate and the carbon content of the Si—C bonds in the alkoxides present in the sol. By way of an illustrative, but nonlimiting example, when using a sol comprising a mixture of tetraethoxysilane (TEOS), dimethyldiethoxysilane (DMDES) and trimethylborate (TMB), the amounts of each if these three reactants present in the sol on a weight basis required for the formation of a gel which, when disposed or coated on a carbon substrate and pyrolyzed in an inert atmosphere to form a ceramic of the invention, is defined by the trapezoid in the ternary diagram illustrated in the Figure. Lightweight, highly oxidation resistant ceramic tiles suitable for use in advanced space vehicle applications have been made by impregnating a porous carbon preform with the sol, followed by gelation, drying and pyrolysis. The carbon of the substrate reacts with the gel to become part of the ceramic. The porous carbon preform also provides the porous structure for the resultant porous, lightweight ceramic tile. The ceramic formed by the process of the invention has a composition $C_aSi_bO_cB_d$ wherein the ratio of the four components is such that if b has a value of 1, then the value of a ranges from 2–4, the value of c ranges from 1–3 and the value of d ranges from 0.03–0.1.

BRIEF DESCRIPTION OF THE DRAWING

The Figure is a ternary graph of an embodiment of the invention in which the trapezoidal area defines the limits of the permissible ranges of the alkoxysilane and boron alkoxide reactants in the sol in weight percent, when the sol reactants are TEOS, DMDES and TMB.

DETAILED DESCRIPTION

As set forth above, the invention relates to an oxidation resistant, amorphous ceramic composition comprising carbon, silicon, oxygen and boron and to a sol-gel method for its preparation, wherein the method comprises coating a carbon substrate with a sol comprising a mixture of silicon and boron alkoxides, such as di- and tetrafunctional siloxanes and a borate ester or boron alkoxide, gelling the sol and heating the coated carbon substrate in an inert atmosphere to form the ceramic. Those skilled in the art will appreciate that the terms "borate ester" and "boron alkoxide" are synonymous and are therefore used herein interchangeably. In one embodiment which is a preferred embodiment for forming a lightweight, porous ceramic of the invention, the carbon substrate comprises a preform of a size, shape and configuration in which it is desired to have the ceramic formed according to the method of the invention. In an illustrative, but nonlimiting example of this embodiment, the carbon substrate is a carbon preform which comprises lightweight, porous carbon felts and boardstock useful as preforms for making lightweight, porous ceramics of the invention which are suitable for use as thermal insulating tiles for reentry space vehicles, such as a space shuttle. In this embodiment, the porous carbon preform is coated by immersion in, or impregnation (infiltrated) with, a sol according to the practice of the invention, with the sol being gelled and dried onto the carbon preform to form a ceramic precursor. The ceramic precursor is then pyrolyzed in an inert atmosphere during which the dried gel and the carbon of the preform react to form a ceramic composition of the invention which has the same size, shape and configuration as the carbon preform. Multiple impregnations with gelation, drying and firing after each impregnation are used to achieve the desired weight, strength and high temperature oxidation stability of the ceramic.

As set forth above, by di- and tetrafunctional alkoxides is meant alkoxides of silicon having two and four Si—O bonds, respectively, particularly siloxanes comprising a mixture of siloxanes with di- and tetraoxygen functionality of the general formula $(RO)_4Si$ and $(R'O)_2Si(R'')_2$ wherein R and R' are the same or different and represent hydrogen or a hydrocarbyl group and wherein R" represents the same or different hydrocarbyl group as R and R'. By "hydrocarbyl" is meant a group comprising carbon and hydrogen which may be straight or branched chain, saturated or alkane, alkenyl unsaturated, or aryl. In general the number of carbon atoms in the hydrocarbyl group will broadly range from 1–8 and more typically from 1–6, wherein at least some of the hydrocarbyl groups contain at least two carbon atoms. It has also been found and forms an aspect of the invention, that the oxygen difunctional silicon alkoxide or siloxane have two Si—C bonds, in addition to the two Si—O bonds. The borate ester is also multifunctional with respect to oxygen functionality, with at least a portion of the borate ester being oxygen trifunctional with respect to having three B—O bonds. Borate esters or boron alkoxides useful in the practice of the invention preferably include boron trialkoxides of the formula $(RO)_3B$, wherein R comprises the same or different hydrocarbyl groups each containing at least one carbon atom as defined above. Thus, the hydrocarbyl may be one or more alkanes such as methyl, ethyl, propyl, isopropyl, butyl, isobutyl, pentyl, hexyl, heptyl, etc., their isomers, and mixtures thereof and may also include alkenyl or vinyl unsaturated groups as vinyl, divinyl, propenes, butenes, etc. and mixture thereof, as well as aryl groups such as phenyl and mixtures thereof. Illustrative, but nonlimiting examples of suitable siloxanes include:

Dimethyldiethoxysilane: $(CH_3)_2Si(OC_2H_5)_2$
Diethyldimethoxysilane: $(C_2H_5)Si(OCH_3)_2$
Diethyldiethoxysilane: $(C_2H_5)_2Si(OC_2H_5)_2$
Diethyldibutoxysilane: $(C_2H_5)_2Si(OC_4H_9)_2$
Divinyldiethoxysilane: $(CH_2{:}CH)_2Si(OC_2H_5)_2$
Tetraethoxysilane: $Si(OC_2H_5)_4$
Tetrapropoxysilane: $Si(OC_3H_7)$
Phenylmethyldimethoxysilane: $(C_6H_5)(CH_3)Si(OCH_3)_2$ Similarly the boron alkoxide may be trimethyl, ethyl, isopropyl, etc. borate. It is preferred that the majority of the hydrocarbyl groups on the boron alkoxide have from 1–5 carbon atoms, with 1–3 being preferred and 1–2 being more preferred. The three hydrocarbyl groups of the boron alkoxide may be the same or different. In one embodiment of the invention the siloxanes are a mixture of TEOS and DMDES, with the boron alkoxide being TMB as set forth above.

The sol is prepared by mixing the siloxane and boron alkoxide reagents, preferably along with an alcohol as a diluent. The presence of the alcohol prevents premature hydrolysis of the sol and also insures that a homogeneous sol is obtained. While it has been found convenient to use ethanol, other alcohols may be used alone or in admixture if desired. Illustrative, but nonlimiting examples of suitable alcohols include methanol, ethanol, propanol, isopropanol, butanol, sec- and isobutanol, pentanol, and the like and mixtures of such alcohols. Although the sol may be gelled by aging at ambient or by heating, in the practice of the invention it is preferred to catalyze gelation by the addition of an acid or base to the reaction mixture. Nitric acid and ammonium hydroxide are useful as gelling agents. Gelation will occur at ambient conditions, but gentle heating to temperatures of from about 40°–90° C. is preferred in addition to the acid or base catalyst. A lightweight, rigid ceramic body of the invention is formed by using a lightweight, porous carbon preform, such as a felt or a boardstock. When using a lightweight, porous carbon preform as the substrate in the form of a porous carbon felt, boardstock, or other form, the alcohol, siloxane and boron alkoxide reagents are mixed; the acid added to catalyze the gelation which, those skilled in the art know comprises simultaneous hydrolysis and polymerization reactions, and the preform impregnated (or infiltrated) by immersion into the sol before gelling occurs to coat the carbon. After gelation, the impregnated preform is removed from the gel, any surplus removed from the outside by wiping and the impregnated preform dried in an oven or at ambient conditions to form a ceramic precursor. Vacuum drying (e.g., overnight at 70°–100° C.) is preferred to insure that all volatiles are removed prior to the inert atmosphere pyrolysis. The ceramic is formed by heating the precursor at a temperature in the range of from about 700°–1500° C. and preferably 900°–1200° C. During the high temperature, inert atmosphere pyrolysis, the carbon of the preform enters into the pyrolysis reaction with the dried gel and forms part of the ceramic. By inert atmosphere is meant vacuum or an atmosphere of one or more noble gasses, such as argon. The so-formed ceramic is amorphous, which means that it is monolithic or unitary in nature. When making a porous ceramic tile from a flexible or rigid porous carbon preform, multiple impregnations may be necessary in order to achieve the desired weight of the final ceramic, with drying and inert pyrolysis following each impregnation.

As mentioned above, the pyrolysis temperature for the inert atmosphere pyrolysis required to form a ceramic of the invention may broadly range from about 700°–1500° C. and preferably from 900°–1200° C., depending on the equipment used by the practitioner and the amount of time available. Different times and temperatures, along with the resultant ceramic properties are illustrated in the Examples below. Those skilled in the art know that reaction times generally decrease as an exponential function of the increase in temperature. By inert atmosphere is meant any atmosphere which will not affect the formation of the ceramic or the ceramic composition itself during the pyrolysis. Suitable inert atmospheres include the noble gasses and vacuum, with the choice left to the practitioner.

The Figure is a ternary graph illustrating the maximum amounts by weight of weight ratio of three preferred reagents used in making a ceramic of the invention. Thus, the Figure has TEOS, DMDES and TMB as the three apex points. The truncated triangle or trapezoidal shaped area within the ternary diagram defines the broad ranges of the weight percentages of the two alkoxysilanes and the boron trialkoxide sol reagents for making a ceramic of the invention in the embodiment wherein these reagents consist essentially of TEOS, DMDES and TMB. The circular area within the trapezoid represents and defines the optimum amounts of these three reactants. Thus, referring to the Figure, it is seen that the amounts of TEOS, DMDES and TMB present in the sol will broadly range from 25–80 wt. % and 5–39 wt. %, respectively. Some trial and error experimentation is required when using one or more different sol reagents as will be appreciated by those skilled in the art to which the invention pertains. The circle within the truncated pyramidal area represents the optimum weight ratios of these three reagents. Other siloxanes and boron alkoxides may be used as will be appreciated by those skilled in the art. However, to the extent that the carbon content of the hydrocarbyl group varies with the group and the carbon of the substrate also reacts with the dried gel to form the ceramic, some experimentation will be required to arrive at the optimum ratios when using other reagents. Based on the results in the Examples below, the optimum and best results using the porous carbon felt and boardstock preforms were obtained when the ratio of the molar ratio of the TEOS to the DMDES and TMB in the sol was in the range of about 1:1:0.4 to 1:1.2:0.6.

The ceramic formed by the process of the invention has a composition $C_aSi_bO_cB_d$ wherein the ratio of the four components is such that if b has a value of 1, then the value of a ranges from 2–4, the value of c ranges from 1–3 and the value of d ranges from 0.03–0.1. Preferably if b has a value of 1 the value of a will range from 2–3, that of c from 1.5–2.5 and that of d from 0.03–0.07. After severe thermal oxidation at temperatures of 1200° C. and more in air, the amount of carbon present greatly decreases while the oxygen present in the ceramic increases. The silicon to boron ratio appears to be about the same even after severe oxidation. Thus, it has been found that even after severe oxidation above 1200° C. the ceramic has a composition of $C_{0.1-0.6}Si_1B_{0.03-0.1}O_{1-4}$.

The invention will be further understood with reference to the Examples below.

EXAMPLES

In all of the examples below, a 1 or ½ inch thick carbon preform comprising either a porous, flexible carbon felt having a porosity volume of about 95%, or a porous, rigid carbon body (boardstock) having a sponge-like structure and a porosity volume of about 90% was immersed in a sol consisting of a mixture of tetraethoxysilane (TEOS), dimethyldiethoxysilane (DMDES), trimethylborate (TMB), ethanol (EtOH), and 1N nitric acid at ambient conditions. The liquid TEOS and DMDES were undiluted, while the TMB was a 70 wt. % solution in methanol.

The carbon preforms were obtained from Fiber Materials, Inc. in Biddleford, Me., with the porous, flexible felt weighing about 5 lb/ft³ and the rigid preform being a carbon bonded carbon fiber insulation material designated as Fiberform® boardstock having a bulk density of 11.2 lb/ft³. The carbon felt is made of carbon fibers having an average diameter in the range of about 10–16 microns. The sol-impregnated carbon preform was then heated to a temperature of about 40°–80° C. to gel the sol. The preform was then removed from the gel, the excess gel removed from the outside surface by gently wiping the gel coated preform, dried in vacuum and heated in argon to pyrolyze the coated preform into a ceramic. This procedure was repeated two (2) to four (4) times until a desired weight of from about 20–30 lbs/ft³ was obtained.

The weight, size and strength of the so-formed ceramics were measured before and after oxidation tests. Except for the Instron tests which measured the tensile strength set forth in the Table below, the strength was determined empirically by compressing the tile and comparing the crush resistance to that of the carbon preform. Excellent strength means that the ceramic tile was stronger than the preform. Good strength means that the strength of the ceramic tile was comparable to that of the preform, while fair and poor mean that the strength was a little less and very little strength left, respectively, compared to that of the carbon preform.

Example 1

In this experiment a 1 cubic inch carbon felt weighing 2.091 grams was immersed in a solution of 15.0 g TEOS, 15.0 g EtOH, 12.0 g DMDES, 4.5 g TMB and 10 cc of the 1N nitric acid which was gelled. The molar ration of the TEOS, DMDES and TMB reagents in solution was 1:1.14:0.42. After gelation, the felt was removed from the gel and excess gently wiped off the surface. After drying in vacuum, the impregnated preform was pyrolyzed for one hour in argon at 1200° C. which produced a ceramic tile weighing 4.4217 g. This procedure was then repeated and the tile weighed 6.1938 g. The ceramic was then heated to 1500° C. in argon for an hour and produced a ceramic tile weighing 5.3095 g. Elemental analysis of the ceramic after the additional hour in argon at 1500° C. revealed the ceramic to have a composition of $C_{2.70}Si_{1.16}B_{0.06}O_{2.00}$ (or $C_{2.33}Si_1B_{0.05}O_{1.72}$).

After heating the 5.3095 g ceramic in air at 1300° C. for one hour it weighed 4.5128 g, had retained its shape well and the strength was still good. After another hour at 1500° C. it weighed 4.5051 g. Its still retained its shape, but its strength was only fair compared to what it had been before oxidation. After yet another hour at 1500° C. it weighed 4.4774 g, the shape was only fair, it was weak and the surface appeared burnt.

Example 2

In this experiment 6 pieces of 1 inch square and ½ inch thick carbon tiles were impregnated by immersion into a solution of 30.0 g of TEOS, 22.0 g DMDES, 8.0 g TMB, 23.0 g EtOH and 14 cc of 1N nitric acid, with the tiles weighing an average of 1.60 g each. The molar ratio of the TEOS, DMDES and TMB in the solution was 1:1.03:0.38. The tiles were impregnated three times, followed by vacuum drying and an hour in argon at 1200° C. after each impregnation, with the resultant ceramic tiles weighing 5.2214, 5.8168, 5.2991, 5.5960, 5.3214 and 5.3246 g.

Two ceramic tiles were heated 1200° C. in air for 15 min., 1300° C. for 30 min., and then 1400° C. and 1500° C. for 30 min. They shrank to 86% of their original size while exhibiting good shape and strength retention.

Two other ceramic tiles were heated in air at 1200° C., 1300° C. and 1400° C. for 30 min. each, continuously, without cooling down to room temperature. The resulting weights were 4.0688 and 4.2551 g with good shape and strength retention.

The 5.2214 g tile was heated in air for 30 minutes each at 1200° C., 1300° C., 1400° C. and 1500° C. and found to have reduced in size to 90% of the original, which is good, and have good strength. It was then heated at 1500° C. for an hour with no further reduction in size, but one side was cracked. After that it weight 3.6805 g.

The sixth tile was further heated at 1500° C. in argon for an hour after the three impregnations and argon heat treatment given to the other five tiles. The ceramic weighed 5.1247 g. It was then heated in air at 1350° C. and 1450° C. for 30 min. at each temperature and found to weigh 3.6661 and 3.6651 g, respectively. After this it was again heated in air for 2 hours at 1500° C. and weighed 3.6951 g with no shrinkage and very good strength retention.

Example 3

In this experiment a 1 inch carbon felt cube was immersed in a solution of 30.0 g TEOS, 30.0 g EtOH, 9.0 g TMB, 25.0 g DMDES and 15 cc of 1N nitric acid which was gelled. The molar ratio of the TEOS, DMDES and TMB in the solution was 1:1.18:0.42. The sample was impregnated 3 times with vacuum drying and heating in argon at 1250° C. for an hour after the first impregnation and an hour at 1300° C. and 1200° C. after the second and third impregnations to yield a ceramic weighing 6.3268 g. The ceramic was then heated in air at 1200° C. for 15 min., then 1200° C. for 30 min., followed by 30 min. each at 1300° C., 1400° C. and 1500° C. The shape and strength were good, with 85% size retention.

Example 4

In this experiment a 1 inch cube carbon tile was impregnated by immersion into a solution of 30.0 g TEOS, 30.0 g EtOH, 10.0 g TMB, 30.0 g DMDES and 15 cc of 1N nitric acid which was gelled. The molar ratio of the TEOS, DMDES and TMB in the solution was 1:1.40:0.47. The sample was impregnated 3 times with vacuum drying and heating in argon at 1200° C. for an hour after each impregnation to produce a ceramic. The ceramic was then heated in air for 30 min. each at 1200° C., 1300° C., 1400° C. and 1500° C. and found to have good strength, but retained only 75% of its size.

Elemental analysis of the oxidized ceramic revealed a composition of $C_{0.65}Si_{1.23}B_{0.08}O_{3.57}$ (or $C_{0.53}Si_1B_{0.07}O_{2.9}$).

Example 5

This experiment was similar to that of Example 4 except that the solution contained 39.0 g of DMDES and 16 cc of 1N nitric acid. The molar ratio of the TEOS, DMDES and TMB reactants was 1:1.83:0.47. After heating in air for 30 min. at each of 1200° C. and 1300° C., the ceramic had shrunk to 65% its original size, but exhibited good strength.

Example 6

In this experiment a 1 inch cube carbon tile was impregnated by immersion into a solution of 10.0 g TEOS, 10.0 g EtOH, 7.3 g DMDES and 5 cc of 1N nitric acid, but no TMB, which was gelled. The molar ratio of the TEOS, DMDES and TMB reactants was 1:1:0. Three impregnations were made with vacuum drying and heating in argon for 1 hour at 1300° C. after each impregnation, followed by an hour at 1500° C. to produce a ceramic. The ceramic was heated in air. After 30 min. at 1300° C. the ceramic looked good, but after an additional hour at 1500° C. it had turned to powder. This thus illustrates the necessity of the presence of boron in a ceramic of the invention.

Example 7

This experiment was similar to that of Example 4, except that the solution contained 10.0 g TEOS, 10.0 g EtOH, 3.0 g TMB, 12.0 g DMDES and 15 cc of 1N nitric acid which was gelled. The molar ratio of the TEOS, DMDES and TMB reactants was 1:2:0.5. The sample was impregnated 3 times with vacuum drying and heating in argon at 1200° C. for an hour after each impregnation, followed by 1500° C. in argon for an hour which produced a ceramic. The ceramic was heated in air for 30 min. at 1300° C., followed by an hour at 1500° C. and found to have no size reduction after 1300° C., but retained only 82% of its size after 1500° C.

Example 8

This experiment was similar to that of Example 7 except that the solution contained 30.0 g TEOS, 30.0 g EtOH, 8.0 g TMB, 22.0 g DMDES and 15 cc of 1N acid which was gelled. The molar ratio of the TEOS, DMDES and TMB reactants was 1:1.03:0.38. The sample was impregnated 3 times with vacuum drying and heating in argon at 1200° C.

for an hour after each impregnation, followed by 1500° C. in argon for an hour which produced a ceramic. The ceramic was then heated in air for 30 min. at each of 1300° C. and 1400° C. and then an hour at 1500° C. and found to have no size reduction after 1300° C., but retained only 87% of its size after 1400° C. and 75% after 1500° C.

Example 9

This experiment was similar to that of example 7 except that the carbon tile preform was only ½ inch thick and the solution contained 15.0 g TEOS, 7.5 g EtOH, 4.0 g TMB, 11.0 g DMDES and 7.5 cc of 1N acid which was gelled. The molar ratio of the TEOS, DMDES and TMB reactants was 1:1:0.4. The sample was impregnated 3 times with vacuum drying and heating in argon at 1200° C. for an hour after each impregnation, followed by 15 min. in argon at each of 1300° C. and 1400° C. and 1500° C. to produce a ceramic. The ceramic was heated in air for an hour at each of 1200° C., 1300° and 1400° C. and 1500° C. and found to have good strength with a 93% size retention.

Example 10

This experiment was very similar to that of Example 12 except that the solution contained 6.0 g TMB instead of the 4 g of Example 12 and after both the second and third impregnations the heating in argon was an hour at 1200° C., followed by an hour at 1500° C. to form a ceramic. The atomic ratio of the TEOS, DMDES and TMB reactants in the solution was 1:1:0.7. The ceramic was heated in air for an hour at each of 1200° C., 1300° C. and 1400° C. and 1500° C. and found to have good strength with a 90% size retention.

Example 11

In this experiment a 1 inch square and ½ inch thick carbon tile was impregnated by immersion into a solution of 20.0 g TEOS, 10.0 g EtOH, 14.7 g DMDES, 8.0 g TMB and 10 cc of the 1N nitric acid which was gelled. The molar ratio of the TEOS, DMDES and TMB reactants was 1:1.04:0.56. Three impregnations were made with vacuum drying and heating in argon at 1000° C. for an hour, followed by 5 min. at 1500° C. to form a ceramic. Sequentially heating at one hour in air at 1000° C., 1200° C., 1300° C., 1400° C. and 1500° C. revealed the strength to be good and a retained size of 97%. Two more hours at 1500° C. resulted in no additional changes in strength or size.

Example 12

Two carbon tiles ½×⅓×1 inch and one tile 1×1×½ inch were impregnated 3 times by immersion into a solution of 30.0 g TEOS, 15.0 g EtOH, 22.0 g DMDES, 12.0 g TMB and 15 cc of 1N nitric acid which was gelled. The molar ratio of the TEOS, DMDES and TMB reactants was 1:1.03:0.56. Three impregnations were made with vacuum drying and heating in argon at 1200° C. for an hour after each impregnation, followed by an additional 15 min. in argon at 1500° C. for the third to produce ceramics. The ceramics were then sequentially heated in air for an hour at each of 1000° C., 1200° C., 1300° C., 1400° C. as in the example above, after which the size and strength were good, followed by an additional hour at 1500° C., after which there was uneven shrinkage.

Example 13

In this experiment a 1 inch cube of carbon felt was impregnated 3 times by immersion into a solution of 20.0 g TEOS, 20.0 g EtOH, 14.7 g DMDES, 8.0 g TMB and 10 cc of 1N nitric acid which was gelled. The molar ratio of the TEOS, DMDES and TMB reactants was 1:1.04:0.56. Three impregnations were made with vacuum drying and heating in argon at 1200° C. for 30 min. then 1500° C. for 10 min. after the first impregnation; 1100° C. for an hour followed by 1400° C. for 30 min. after the second, and 1100° C. for an hour followed by 1400° C. for an hour after the third. The ceramic was then sequentially heated in air for an hour at each of 800° C., 1000° C., 1200° C., 1300° C., 1400° C. and 1500° C. as in the example above, after which no change in the size and strength were found.

elemental analysis of a ceramic sample oxidized in air for one hour at 1500° C. revealed a composition of $C_{0.56}Si_{1.60}B_{0.10}O_{2.96}$ (or $C_{0.35}Si_1B_{0.06}O_{1.85}$).

Example 14

A 1 inch cube of carbon tile was impregnated 3 times by immersion into a solution of 20.0 g TEOS, 20.0 g EtOH, 14.7 g DMDES, 8.0 g TMB and 10 cc of 1N nitric acid which was gelled. The molar ratio of the TEOS, DMDES and TMB reactants was 1:1.04:0.56. Three impregnations were made with vacuum drying and heating in argon at 1200° C. for 30 min. then an hour at 1400° C. after each impregnation to produce a ceramic tile. The ceramic was then sequentially heated in air for an hour each at 1200° C., 1300° C., 1400° C. and 1500° C. as in the example above, after which the tile retained 93% of its size and strength was good.

Example 15

A 1 inch cube of carbon felt was impregnated by immersion into a solution of 20.0 g TEOS, 20.0 g EtOH, 14.7 g DMDES, 8.0 g TMB and 10 cc of 1N nitric acid which was gelled. The molar ratio of the TEOS, DMDES and TMB reactants was 1:1.04:0.56. Three impregnations were made with vacuum drying and heating in argon at 1100° C. for an hour followed by an hour at 1400° C. after the first impregnation; at 1200° C. for an hour after the second impregnation, and 1500° C. for an hour after the third impregnation to produce a ceramic. As in the example above, the ceramic was then sequentially heated in air for an hour each at 1200° C., 1300° C., 1400° C. and 1500° C., after which the tile retained 99% of its size and strength was good.

Example 16

Six 1 inch cube carbon tiles were each impregnated by immersion into a solution of 50.0 g TEOS, 50.0 g EtOH, 37.7 g DMDES, 20.0 g TMB and 25 cc of 1N nitric acid which was gelled. The molar ratio of the TEOS, DMDES and TMB reactants was 1.0:1.06:0.56. Three impregnations of each tile was made with vacuum drying and heating in argon at 1200° C. for an hour followed by an hour at 1500° C. after each impregnation, with two of them receiving an additional 2 and ½ hours at 1500° C. to produce ceramic tiles. The ceramic tiles were sequentially heated in air for an hour at each of 1300° C., 1400° C. and 1500° C., after which the tiles exhibited no size reduction and strength was good.

Example 17

Four 1 inch cube carbon tiles were each impregnated by immersion into a solution of 40.0 g TEOS, 40.0 g EtOH, 29.4 g DMDES, 16.0 g TMB and 20 cc of 1N nitric acid which was gelled. The molar ration of the TEOS, DMDES and TMB reactants was 1:1.04:0.56. Three impregnations of each tile was made with vacuum drying and heating in argon at 1200° C. for an hour followed by 10 minutes at 1500° C. after each impregnation. This was followed by 2 more hours at 1500° C. in argon to produce a ceramic.

An elemental analysis of two of the ceramic tiles was made which revealed a ceramic composition of $C_{2.70}Si_{1.16}B_{0.06}O_{2.00}$. This gives a ratio of C:Si:B:O: of 2.33:1:0.05:1.72.

The two other ceramic tiles were heated in air at 1200° C. for two hours, after which an elemental analysis was made. The elemental analysis of the oxidized ceramic revealed a composition of $C_{0.30}Si_{2.00}B_{0.08}O_{2.46}$. This gives a ratio of C:Si:B:O of 0.15:1:0.04:1.23.

Thus, the oxidative pyrolysis of the ceramic resulted in a substantial loss of carbon and some oxygen, but the Si to B ratio remained about the same.

Example 18

Eight 1 inch cubes of carbon felt were each impregnated by immersion into a solution of 60.0 g TEOS, 60.0 g EtOH, 45.6 g DMDES, 24.0 g TMB and 30 cc of 1N nitric acid which was gelled. The molar ratio of the TEOS, DMDES and TMB reactants was 1:1.04:0.56. Three impregnations of each felt was made with vacuum drying and heating in argon at 1200° C. for an hour followed by 15 minutes at 1500° C. after each impregnation to produce a ceramic. Tensile strength of the ceramic was measured using an Instron and the average strength shown in the Table below.

This experiment was repeated and the ceramic tiles were then severely oxidized by sequentially heating in air at 1000°, 1200°, 1300°, 1400° and 1500° C. for an hour at each temperature, with the tensile strength measured and shown in the Table below.

Example 19

Eight 1 inch cubes of carbon tile were each impregnated by immersion into a solution of 60.0 g TEOS, 60.0 g EtOH, 45.6 g DMDES, 24.0 g TMB and 30 cc of 1N nitric acid which was gelled. The molar ratio of the TEOS, DMDES and TMB reactants was 1:1.04:0.56. Three impregnations of each felt was made with vacuum drying and heating in argon at 1200° C. for an hour followed by 15 minutes at 1500° C. after each impregnation to produce a ceramic. Tensile strength of the ceramic was measured using an Instron and the average strength shown in the Table below.

This experiment was repeated and the ceramic tiles were then severely oxidized by sequentially heating an air at 1000°, 1200°, 1300°, 1400° and 1500° C. for an hour at each temperature, with the tensile strength measured and shown in the Table below.

TABLE

Tensile Strength of Ceramics

| Example | Carbon Preform | Oxidation | Tensile Strength (psi) |
|---------|----------------|-----------|------------------------|
| 19 | felt | no | 12 (s) |
| 19 | felt | no | 9 (w) |
| 19 | felt | yes | 7 (s) |
| 19 | felt | yes | 3 (w) |
| 20 | tile | no | 180 (s) |
| 20 | tile | no | 50 (w) |
| 20 | tile | yes | 20 (s) |
| 20 | tile | yes | 6 (s) |

(s) = strong direction
(w) = weak direction

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A ceramic composition consisting essentially of $C_aSi_bO_cB_d$ wherein b has a value of 1, the value of a ranges from 2–4, the value of c ranges from 1–3 and the value of d ranges from 0.03–0.1.

2. A composition according to claim 1 wherein b has a value of 1 the value of a ranges from 2–3, the value of c ranges from 1.5–2.5 and the value of d ranges from 0.03–0.07.

3. A composition according to claim 1 which is amorphous.

4. A composition according to claim 2 which is amorphous.

5. A ceramic composition consisting essentially of $C_aSi_bO_cB_d$ wherein b has a value of 1, the value of a ranges from 0.1 to 0.6, the value of c ranges from 1 to 4 and the value of d ranges from 0.03 to 0.1.

* * * * *